US008440164B2

(12) United States Patent  
Stephansen

(10) Patent No.: US 8,440,164 B2  
(45) Date of Patent: May 14, 2013

(54) METHOD FOR CONTINUOUSLY AND PROPORTIONAL ADDING OF LIME

(75) Inventor: Poju R. Stephansen, Borgen (NO)

(73) Assignee: Poju R. Stephansen AS, Borgen (NO)

( * ) Notice: Subject to any disclaimer, the term of this patent is extended or adjusted under 35 U.S.C. 154(b) by 278 days.

(21) Appl. No.: 12/666,638

(22) PCT Filed: Jun. 25, 2008

(86) PCT No.: PCT/NO2008/000236
§ 371 (c)(1),
(2), (4) Date: Nov. 15, 2010

(87) PCT Pub. No.: WO2009/002186
PCT Pub. Date: Dec. 31, 2008

(65) Prior Publication Data
US 2011/0064646 A1    Mar. 17, 2011

(30) Foreign Application Priority Data
Jun. 25, 2007    (NO) .................................. 20073252

(51) Int. Cl.
 C01B 13/14    (2006.01)
 C01F 5/02    (2006.01)
 C01F 5/14    (2006.01)
 C01F 11/02    (2006.01)
(52) U.S. Cl.
 USPC ........................................................ 423/640
(58) Field of Classification Search .................. 423/640
 See application file for complete search history.

(56) References Cited

U.S. PATENT DOCUMENTS 3,630,504 A * 12/1971 Reynolds ...................... 423/175  
4,636,379 A *  1/1987 Bestek et al. ................. 423/640  
4,741,896 A *  5/1988 Thomas, Sr. .................. 423/640

(Continued)

FOREIGN PATENT DOCUMENTS

DE    34 40 076 A1    5/1986  
GB    2 048 107 A    12/1980

OTHER PUBLICATIONS

International Search Report, dated Feb. 26, 2009, issued in corresponding International Application No. PCT/NO2008/000236.

*Primary Examiner* — Anthony J Zimmer  
(74) *Attorney, Agent, or Firm* — Klarquist Sparkman, LLP

(57) ABSTRACT

This disclosure relates to a method for continuously and proportional adding of lime to a water flow through in a plant, wherein a number of slakers are used for batchwise slaking of burnt lime, and wherein lime slurry with a greater degree of fineness and prolonged sedimentation time is produced. A first slaker empties completely slaked and diluted lime slurry after the weight principle proportional to the water flow through of the plant, until a predetermined mass of slurry weight is left, which is used for mixing with a next batch. A second slaker, which is ready for its emptying sequence, starts emptying completely slaked and diluted lime slurry after the weight principle proportional to the water flow through of the plant, when the first slaker has finished emptying, until a predetermined mass of slurry weight is left, which is used for mixing with a next batch. After flushing with flushing water via valves of respective slakers, production of a new batch is started, this is ready for its emptying sequence when the active slaker has finished its emptying.

2 Claims, 1 Drawing Sheet

U.S. PATENT DOCUMENTS

| | | | | |
|---|---|---|---|---|
| 4,917,869 A | * | 4/1990 | Graf | 422/162 |
| 5,223,239 A | * | 6/1993 | Moran et al. | 423/640 |
| 5,492,685 A | * | 2/1996 | Moran et al. | 423/244.07 |
| 5,558,850 A | * | 9/1996 | Bleakley et al. | 423/432 |
| 5,746,983 A | * | 5/1998 | Stephansen | 422/162 |
| 5,876,689 A | * | 3/1999 | Webeling et al. | 423/640 |
| 5,965,103 A | * | 10/1999 | Golley et al. | 423/640 |
| 6,245,315 B1 | * | 6/2001 | Banerjee et al. | 423/640 |
| 6,270,631 B1 | * | 8/2001 | Anthony | 204/157.42 |
| 7,105,146 B2 | * | 9/2006 | Hassibi | 423/640 |
| 7,744,678 B2 | * | 6/2010 | Laudet et al. | 95/137 |
| 7,771,682 B2 | * | 8/2010 | Ghosh et al. | 423/160 |
| 8,153,088 B2 | * | 4/2012 | Stephansen | 423/164 |
| 2004/0175324 A1 | * | 9/2004 | Hassibi | 423/640 |

\* cited by examiner

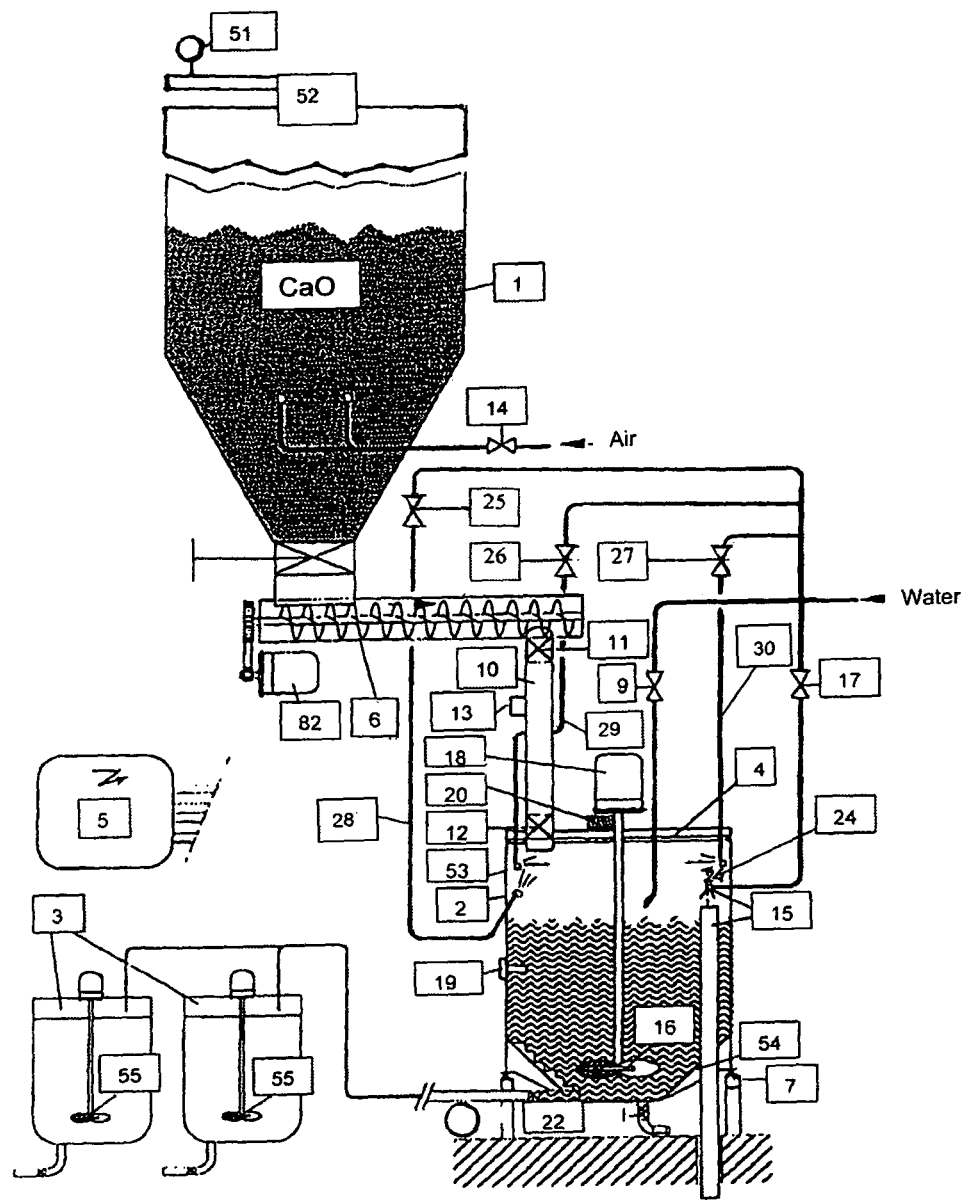

METHOD FOR CONTINUOUSLY AND PROPORTIONAL ADDING OF LIME

The present invention relates to a method for continuously and proportional adding of lime to a water flow through in a plant, in where it is used a number of slakers for batch wise slaking of burnt lime, and wherein lime slurry with a greater degree of fineness and prolonged sedimentation time is produced.

Lime slakers of different types, where most of them are intended for continuous operation, have been applied industrially for some time. "W+T" and "BJF" slakers can be mentioned as examples.

U.S. Pat. No. 4,547,349 relates to a device for non-batchwise, continuous slaking of lime. In UK Patent Application GB 2048107A, a lime slaker is shown and described, also for non-batchwise operation. EP Patent Application 0510675A3 concerns a lime slaker for non-batchwise continuous operation. CA Patent Application 1212825 relates to a regulated process for batchwise production of slaked lime.

GB 2048107 relates as mentioned to continuously non-batchwise slaking of lime. There is however shown two slakers 1 and 1' which can operate alternately (as shown in FIG. 5 in the document), but these two slakers are not operated separately. Instead, it is a combined plant, in where the product (lime slurry) from one slaker has an outflow from the top of the other slaker. Thus, there is not used intermediate storage- or dosing tanks in GB 2048107, as the slaker in GB 2048107 as closed bottom and outflow from the top.

Lime slakers that are operated continuously have in common that they are difficult to control, very maintenance demanding, not suited to computer-controlled operation and costly to produce.

In NO Patent Application 19933084, previously submitted by the present applicant P R Stephansen, a method is described for batchwise slaking, so-called "batch slaking" of burnt lime, also in small amounts relative to the volume of the slaker, whereupon a final product with relatively low lime concentration is obtained.

The content of the present application is a further development of NO Application 19980435, previously submitted by the present applicant P R Stephansen, and is hereby incorporated by reference.

During operation of a lime slaker, and corresponding systems, impurities and dust can lead to build-up of limestone, which influences the slaking and can lead to blowouts at high temperatures. It is provided a new, immediate cleaning method that prevents build-up of limestone and the disadvantages this leads to. It is a further object of the invention to provide a method which utilizes the system in the slaker, in such a way that it is not necessary with buffer tanks between the slakers and the water flow through of a plant, which has turned out to be a huge problem. It is thus provided a simplified delivery to the plant, without interim storage in dosing tanks, and in that way build up of lime stone is prevented in the other tanks and in the system. This has previously showed to be difficult, due to dosing problems, and in that respect it has been common with installation of for instance flow meters to measure and control the flow through.

Said plants can be many type of plants or combinations of plants, which uses adding of lime, among others plant for water treatment to both drinking water and agriculture, plants for drainage cleaning, plants for slurry disposal, etc. etc.

A closed system is provided that does not produce dust and with the background in the immediate cleaning, an installation is provided with at least reduced maintenance due to the reduction of the build-up of limestone.

The present invention is characterized in that a first slaker is emptying completely slaked and diluted lime slurry after the weight principle proportional to the water flow through of the plant, until a predetermined mass of slurry weight is left, which is used for mixing with next batch, a second slaker, which is ready for its emptying sequence, starts emptying completely slaked and diluted lime slurry after the weight principle proportional to the water flow through of the plant, when the first slaker has finished emptying, until a predetermined mass of slurry weight is left, which is used for mixing with next batch, and after flushing with flushing water via valves of respective slaker, production of a new batch is started, which is ready for it emptying sequence when the active slaker has finished its emptying.

Preferably, respective slaker is emptied directly to the water flow through of the plant, without use of intermediate buffer- or dosing tanks.

The invention shall be described with the help of the enclosed FIGURE that shows an example embodiment of a lime slaker device.

In the execution of the method according to the invention for batchwise warm-slaking of burnt lime, a lime slaker device is used as shown and described in detail in said NO Patent Application 19933084, to which reference is made.

It shall be pointed out that values for given weights, volumes, temperatures, times, etc are given as examples, and said values must therefore not be regarded as absolute.

A preferred lime slaker device, which is schematically shown in FIG. 1, comprises in the main a lime slaker 2 with an effective volume, for example, of 2100 liters (weight scale range 0-2500 kg), with a cylindrical upper section 53 and a conical lower section 54, fitted on three load cells 7 for batchwise weighing of water and lime, and with a stirrer 16 with a specially constructed mixing body and drive motor 18, rotation monitor 20 and also a water-jet driven combined dust suction/weir appliance/baffle 15 that is supplied water through a pipeline with a valve 17, where the slaker 2 receives water through a pipeline with valves 8 and 9. The slaker lid 4 is connected to a specially constructed water-outlet-preventing valve that also separates the wet and the dry lime zone. The slaker is connected to a lime silo 1 with a level gauge and also a filter 52 with a drive motor 51 for mechanical cleaning. The silo can hold 80 tonnes of burnt lime, for example, of volumetric weight 1.1 (weight scale range 0-90 tonnes), and is equipped with load cells to read the weight. The load cells amplifier gives out a 4-20 mA signal to a PLS. The silo can also be fitted with three air activators that are started and follow a given cycle, if the dosing time for the screw transporter is exceeded.

The silo is filled with lime through the inlet pipe from, for example, a tank lorry. The weight of the amount in the silo is displayed from a cabinet at the silo filling location. When 95% of the weight (AH) has been reached, an alarm in the form of a sound/light signal is given as a warning that the filling must be stopped. The sound alarm can be set from the cabinet and/or automatically by the PLS, for example, after three minutes. At 100% weight (AHH), a filling valve is automatically shut and the feeding of lime is stopped. While the valve is shut, a red warning lamp in the cabinet indicates that the filling of the silo can not take place. The filling valve can be controlled manually from the panel in the control centre.

Load cells fitted on the silo emit an alarm signal and a trip signal:
at $\geq$AH Alarm. The operator is warned about a high level in the silo.
at $\geq$AHH Warns the operator and shuts the inlet valve.
at $\leq$ALZ Alarm. Low level in the silo.

The filter motor is preferably fitted with a safety switch and a service vender (automatic/manual).

After the filling of lime in the silo has been completed, the filter motor 51 is started manually from a local cabinet. A signal is emitted from the cabinet to an outer PLS that starts the filter motor and monitors the operational state of the motor. The filter motor 51 stops automatically after three minutes.

EXAMPLE

1. Start button in a local cabinet is activated
2. Filter motor 51 starts and the operation light in the cabinet lights up.
3. The filter motor stops after about three minutes Lime is transferred with the screw transporter 6 from the silo 1 to the slaker 2 with the butterfly valves 11 and 12 open. The slaking is initiated in that the first batch is slaked manually. The addition of lime is thereafter automatic, whereby the slaker 2 is filled with a predetermined amount of diluting water. The slaker is thereafter emptied to a predetermined residual amount, into which the next batch of lime is to be slaked.

The lime slaking temperature is decided by the ratio between residual number of kilos diluted lime slurry in the slaker (EVL) and the number of kilos of added lime (EVH), or the chosen set-points on the load cells 7, i.e. the set-points on the scale one chooses. The concentration of fully slaked lime is determined finally by the number of kilos of water that are chosen at the last set-point (EVHH). The number of kilos of water that are chosen at the last set-point (EVHH) is determining for the concentration of fully slaked lime.

The load cells 7 generate five working contacts for use in sequence:

at ≧EVHHH Filling of water to the upper level.
at ≧EVHH Reached amount of filled flushing water.
at ≧EVH Reached amount of added lime.
at ≧EVL New slaking level reached before new slaking.
at ≧EVLL Stirrer is stopped.

Fully slaked lime is sent to storage tank 3 through the valve 22 with the help of a motor. The motor is preferably fitted with a safety switch and a service vender.

At the start, the slaker 2 is manually filled with 400 liters of water, followed by 120 kg lime under stirring. When the mixture has reached a stable temperature of about 80° C., registered by a temperature measuring element, automatic operation can start and water is added to a mixture weight of 1200 kg, which gives a 10% slurry with a temperature of about 30° C.

The slaker can now be emptied to a predetermined weight of, for example, 600 kg. This is followed by a break of 30 seconds for return from, for example, the pump. It is important that the control system can register the real value of the batch and is tared to 0 kg, which is necessary because inertia in the system can lead to a risk of more or less chemicals than predetermined being added to the slaker.

With automatic control, when the weight in the slaker 2 is 600 kg or a newly calculated value based on the temperature regulation and after a pause of 30 seconds has expired, the slaking process will start if it is not already underway and the valve 22 will be closed.

Butterfly valve 12 in the slaker lid receives an opening signal and is confirmed in an open position from limit switches, the opening signal is sent over to the valve 17, and a dust suction unit 15 is started. After five seconds time delay the butterfly valve 11 is opened at the outflow end of the screw transporter 6 and is confirmed as open from a limit switch. A rotation monitor controls that the stirring has begun and an alarm is given if this is not the case or if the valve is not open after the command. If stirring stops, the valve 9 is opened and the slaker is completely filled with water and the process is interrupted.

The screw transporter 6 is started five seconds after one limit switch has confirmed that valve 11 is in an open position, and initiates the timer for normal dosing time, for example 180 seconds. The correct dosing time is set at start up of the plant. If the time is exceeded by 100% (360 seconds in this example), the air stimulator will be opened and closed in a determined cycle (open for about 0.5 seconds for every 30 seconds) with a start in the pause part and limited to 180 seconds. If the predetermined weight in the mixer is still not achieved the cycle will be interrupted because the storage tank signals a low level and an alarm is given.

The screw transporter 6 is kept going until the required lime amount (120 kg) has been weighed-in. One second after the screw transporter has stopped the butterfly valve 11 is closed. Ten seconds after the valve is confirmed as closed, a magnetic valve is opened for three seconds for air to the outflow vibrator. The butterfly valve 12 is closed for 20 seconds after the butterfly valve 11 is confirmed as closed, and a limit switch controls that the valve is closed. When the valve has closed, the weight is recalibrated to 0 kg. An alarm is sounded if the valve is not closed after the command.

For immediate cleaning of the slaker 2 before the next slaking, after the mentioned recalibration of the load cell aggregate 7, a number of valves are opened for a fixed period of time for supply of flushing water to the respective nozzles, in that the flushing water is supplied sequentially via each valve to associated nozzles(s) until a predetermined amount of flushing water is reached in the slaker 2. For example, five seconds after the butterfly valve in the slaker 2 has signalled closed, the first valve 25 is opened for flushing water with a nozzle for ten seconds, after which the first valve 25 is closed and the second valve 26 is opened for flushing water with three nozzles for eight seconds, after which the second valve 26 is closed and the third valve 27 is opened for flushing water with three nozzles on the opposite side, until a total predetermined amount of flushing water has been weighed in by the slaker itself, for example 20 kg.

As shown in the FIGURE, the first valve 25 controls the delivery of water to one or more nozzles via a pipe 28, while the second valve controls delivery of water to one or more nozzles via a pipeline 29, and the third valve 27 controls delivery of water to one or more nozzles via a pipeline 30. Preferably, nozzles are placed on opposite sides in the slaker, for example, the nozzles can be placed in one half part of the slaker or in the whole of the slaker's perimeter with, for example, the same or different mutual spacing.

20 seconds after valve 12 is closed, the closing signal is given to valve 17 and the dust suction 15 is stopped. After the screw transporter is stopped, adjustable slaking time is begun, for example ten minutes. The chosen slaking time and the course of this should be indicated to the operator.

When the slaking time is finished, water is supplied through valve 8 and through the flushing nozzles 24 for 15 seconds. Thereafter 1180 kg of diluting water (calculated from the second 0-calibration which has already added 20 kg of water) is supplied through valve 9, which gives a 10% lime slurry at a temperature of 30° C. With an error in amount of lime added above +2% the amount of diluting water is adjusted.

The temperature in the slaker is monitored by a temperature measuring element. If a temperature of 83° C. is not reached during the slaking process, 15 kg more of the finished slurry is emptied out, whereby EVLL reduces to 485 kg or conversely if the temperature is too high (88° C.) to 515 kg.

If the temperature during the slaking process rises above 96° C., the valve 8 is also opened, the slaker is filled with water until full level EVHHH, the process is interrupted and an alarm is given, without the stirring being stopped.

As previously described, for preparation of a 10% lime slurry it is required to add 60 kg of lime and 600 kg of water. The total level will vary depending on the temperature regulation. The finished concentration grade of the lime slurry is determinative for the temperature of the slurry into which the lime is added for the next slaking. If a lime slurry with a higher concentration grade is wanted, the slaking should take place at a higher initial temperature. If a lower concentration grade is required at, for example, the point of use, the slurry should be diluted outside the slaker, for example, by proportional dosing between water and lime solution in the pipeline after the storage tank. Addition of water can be regulated with a flow meter and a regulation valve. Alternatively, measured amounts of water can be added in the storage tank at the same time as the slaker, from full weight in smaller batches, for example, four, adds proportional lime slurry amounts in the storage tank.

After completed slaking time the level in the storage tank is controlled, and when this is reduced to EVLL, valve 22 is opened and the batch is emptied into the storage tank.

Finished lime slurry is temporarily stored in the storage tanks 3 which are equipped with a level measure in the form of a pressure transmitter and also stirrer(s). The tank can generate signals for regulation of the slaking sequence. The level signal generates two working contacts for use in the sequence and also two signals for alarm at low and high level, respectively, and one signal for starting of pumps.

at ≧EVL: Slaking can be initiated.
at ≧EVLL: Signal for receipt of a new batch from slaker.
at ≧AHH: Alarm, level too high. Valve is closed.
at ≧AL: Alarm, level too low.
at ≧ALL: Alarm, very low level. Pumping out from tank 3 is stopped.

The stirrer shall operate continuously and is monitored by PLS. An alarm is given in addition to stop.

For the dosing of the slurry, one or more pumps are used. The pumps are arranged "standby" for each other and can be reset manually. Sealing water is added to the packing box of the pumps through solenoid valves and has inbuilt flow switches for discharge of water if the sealing water does not appear for more than three minutes after start, an alarm is given and the pumps stop. The same will happen if sealing water is absent for three minutes during operation. Additionally, each pump is equipped with a flow detector and a pressure sensor which is fitted in the pipe on the pressure side of the pumps. If these do not register an amount of water and pressure after 15 seconds, an alarm is given. If the water and the pressure are absent for a further 15 seconds the pumps stop. A flow meter is used to measure the amount of slurry from the storage tank to the sand filter. This measuring unit sends a 4-20 mA signal back to the frequency converter(s). Sediment is emptied from the storage tank through a manually operated bottom valve.

In the present method, a system with a number of slakers 2 can be used for batchwise slaking of burnt lime, as previously mentioned above, to prevent build up of limestone in slakers, tanks, and the system.

Preferably shall a first slaker 2 empty completely slaked and diluted lime slurry, produced according to the above method, in where the slaker is emptied after the weight principle proportional to the water flow through of the plant, without use of intermediate buffer- or dosing tanks, until a predetermined mass of slurry weight is left. This mass of slurry weight is used for mixing with next batch. A second slaker in the system, which is ready for its emptying sequence, starts emptying completely slaked and diluted lime slurry, also produced after the above method, after the weight principle proportional to the water flow through of the plant, until a predetermined mass of slurry weight is left, which is used for mixing with next batch. The second slaker starts basically when the first slaker has finished its emptying, or when the first slakers emptying rate has reached a predetermined level.

After flushing with flushing water via valves of respective slaker, production of a new batch is started, that is ready for it emptying sequence when the active slaker has finished its emptying. The flushing is done as described above in that a number of valves are opened after fixed time periods for addition of flushing water to respective nozzles, wherein flushing water is supplied sequentially via each valve to the associated nozzle(s), until a predetermined amount of flushing water is reached in the slaker. Flushing water is supplied until total amount of flushing water is weighted in.

The invention claimed is:

1. A method for adding lime to a water flow through of a plant comprising plural slakers for batchwise slaking of burnt lime, the method comprising:
    after slaking burnt lime in a first slaker, emptying completely slaked and diluted lime slurry from the first slaker, until a predetermined amount of residual slurry is reached, which residual slurry is used for mixing with a next batch of burnt lime in the first slaker;
    after slaking burnt lime in a second slaker and when the first slaker has finished emptying, emptying completely slaked and diluted lime slurry from the second slaker, until a predetermined amount of residual slurry is reached, which residual slurry is used for mixing with a next batch of burnt lime in the second slaker;
    after an emptying of a slaker, flushing the emptied slaker with water; and
    after a flushing of a slaker, slaking a next batch of burnt lime in the flushed slaker.

2. The method according to claim 1, wherein the emptyings are directly to the water flow through of the plant, without use of intermediate buffer or dosing tanks.

* * * * *